United States Patent [19]

Tarlton, Sr.

[11] Patent Number: 5,054,597
[45] Date of Patent: Oct. 8, 1991

[54] ADAPTER CLIP FOR FRICTION CLUTCH HAVING INTERMEDIATE PLATE POSITIONING MEANS

[75] Inventor: James K. Tarlton, Sr., Auburn, Ind.

[73] Assignee: Dana Corporation, Toledo, Ohio

[21] Appl. No.: 458,988

[22] Filed: Dec. 29, 1989

[51] Int. Cl.$^5$ ............................................. F16D 13/75
[52] U.S. Cl. ............................. 192/70.25; 192/111 A
[58] Field of Search ......................... 192/70.25, 111 A

[56] References Cited

U.S. PATENT DOCUMENTS

| | | | |
|---|---|---|---|
| 2,061,093 | 11/1936 | Tatter | 192/111 A X |
| 3,086,634 | 4/1963 | Reed | 192/111 A X |
| 3,360,089 | 12/1967 | Cockerill et al. | 192/111 A X |
| 3,438,464 | 4/1968 | Barrington | 192/70.2 |
| 4,142,610 | 3/1979 | Alexander et al. | 192/111 A X |
| 4,601,373 | 7/1986 | Després et al. | 192/70.25 |
| 4,640,399 | 2/1987 | Börjesson | 192/70.25 |
| 4,640,400 | 2/1987 | Nakane et al. | 192/70.25 |
| 4,684,002 | 8/1987 | Takeuchi | 192/70.25 |
| 4,715,484 | 12/1987 | Flowtow | 192/70.25 |
| 4,717,001 | 6/1988 | Yoneda | 192/30 V |
| 4,848,555 | 7/1989 | Riese et al. | 192/70.25 |

Primary Examiner—Rodney H. Bonck
Assistant Examiner—Nicholas Whitelaw
Attorney, Agent, or Firm—MacMillan, Sobanski & Todd

[57] ABSTRACT

An adapter clip which can be attached to the cover of an older style multiple plate friction clutch to quickly and easily permit the use of intermediate plate positioner pins is disclosed. The clip includes a central web portion having a circular recessed area formed therein. The web portion is further formed having first and second flange portions which extend in opposite directions from the sides of the web portion. First and second leg portions extend from the opposed ends of the web portion. The first leg portion extends a relatively long distance and terminates in a hooked end portion, while the second leg portion extends a relatively short distance. The adapter clip can be quickly and easily attached in a slot formed in a leg portion of an older style cover to permit the use of intermediate plate positioner pins.

12 Claims, 3 Drawing Sheets

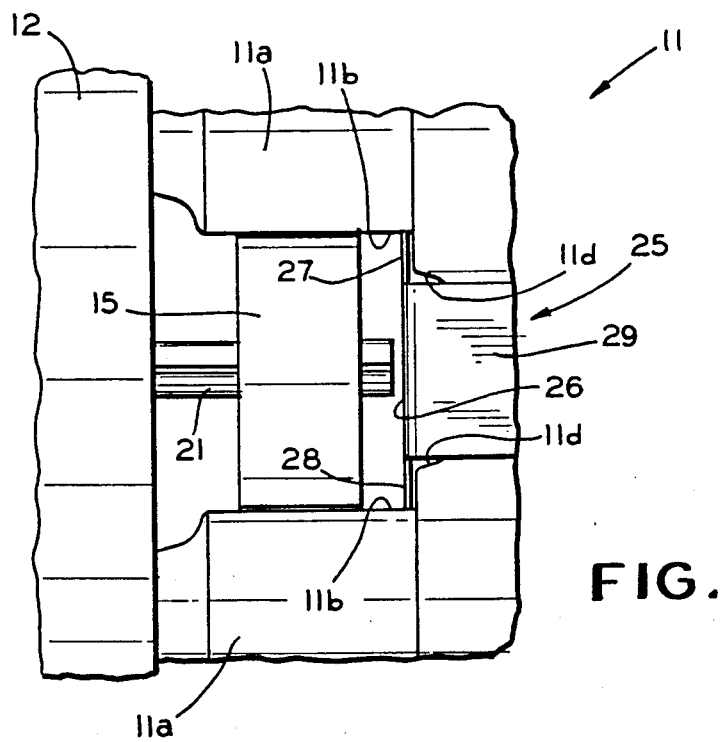
FIG. 4
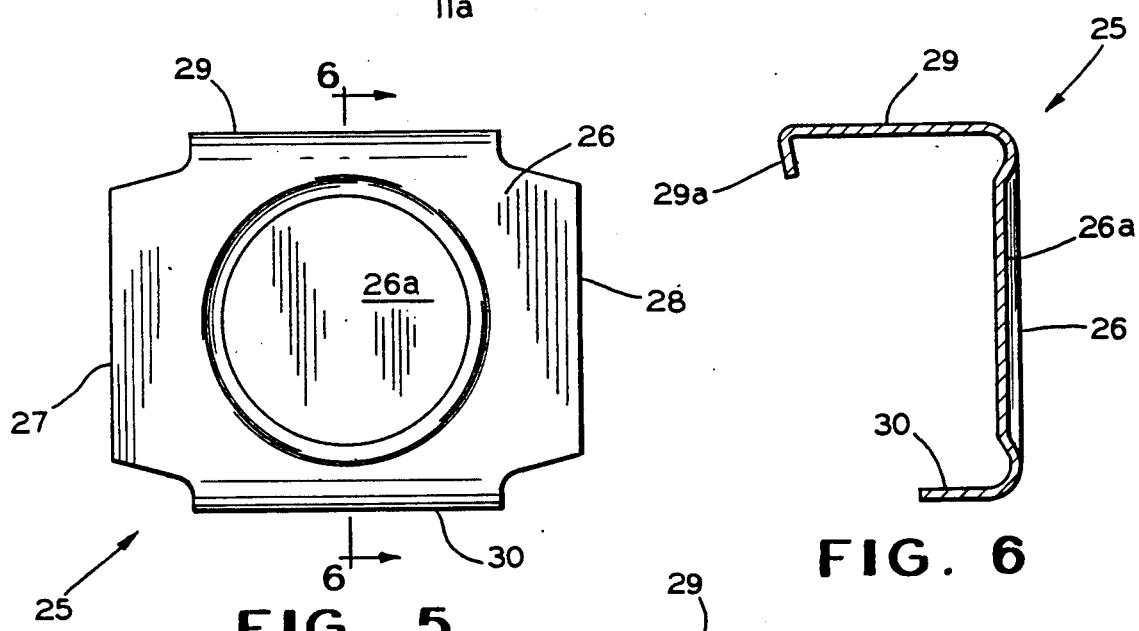
FIG. 5
FIG. 6
FIG. 7

ADAPTER CLIP FOR FRICTION CLUTCH HAVING INTERMEDIATE PLATE POSITIONING MEANS

BACKGROUND OF THE INVENTION

This invention relates in general to multiple disc friction clutches and in particular to an adapter clip for updating an older style clutch cover for use with an intermediate plate positioning means.

Clutches are well known devices which are used to selectively connect a source of rotational power, such as the crankshaft of an engine, to a driven mechanism, such as a transmission or a power take-off unit. Typically, a cover of the clutch is connected to a flywheel carried on the end of the engine crankshaft for rotation therewith. Between the flywheel and the clutch cover, a pressure plate is disposed. The pressure plate is connected for rotation with the flywheel and the cover, but is permitted to move axially relative thereto. A shift lever assembly is provided for selectively moving the pressure plate back and forth in the axial direction.

A driven disc is disposed within the clutch between the pressure plate and the flywheel. The driven disc is carried on an output shaft of the clutch, which forms the input to the transmission or the power take-off unit. When the pressure plate is moved toward the flywheel, the driven disc is frictionally engaged therebetween so as to cause the output shaft of the clutch to rotate with the flywheel, the cover, and the pressure plate. When the pressure plate is moved away from the flywheel, the driven disc is released from such frictional engagement so as to disconnect this driving connection.

The ability of the clutch to transmit torque from the flywheel to the output shaft may be increased by using more than one driven disc as described above. In a multiple disc clutch, an intermediate plate is disposed between the flywheel and the pressure plate. As with the pressure plate, the intermediate plate is connected for rotation with the flywheel and the cover of the clutch, while being permitted to move axially relative thereto. A first driven disc is disposed between the pressure plate and the intermediate plate, while a second driven disc is disposed between the intermediate plate and the flywheel. The operation of the multiple disc clutch is similar to that described above.

When the pressure plate is moved away from the flywheel to release the frictional engagement of the driven discs, it is desirable that the intermediate plate be positioned equidistantly between the two driven discs to prevent undesirable wear. In the past, multiple disc clutches were not provided with any means for positioning the intermediate plate in this manner. However, it is now common to provide such a means, and various positioning mechanisms are known for accomplishing this. Many of these positioning mechanisms include the use of pins frictionally supported in axially extending apertures formed through the outer periphery of the intermediate plate. The forward ends of the pins are adapted to abut the flywheel when the driven discs are frictionally engaged, while the rearward ends of the pins are adapted to abut an abutment surface formed on the cover when the driven discs are released. As wear occurs within the clutch, the pins are moved axially relative to the intermediate plate to continuously reposition the intermediate plate such that it remains equidistant between the driven discs when the clutch is disengaged. An example of such an intermediate plate positioning means is disclosed in U.S. Pat. No. 4,941,557 to Flotow et al., owned by the assignee of this invention.

As mentioned above, some older multiple disc clutches were not provided with any means for positioning the intermediate plate equidistantly between the two driven discs. When such older clutches are removed from service for periodic maintenance, it has been found to be desirable to update them to include an intermediate plate positioning means. In theory, such updating can be accomplished in a relatively simple and inexpensive fashion, because the older style intermediate plate (having no apertures or positioner pins) needs only to be replaced with a newer style intermediate plate (having such apertures and positioner pins).

Unfortunately, in actual practice, a problem has arisen which complicates this updating process. The problem is that the covers of such style older clutches were not designed to provide any convenient abutment surface for the positioner pins, as described above. It is known to weld bosses onto these older covers in appropriate locations to provide the required abutment surface. However, this has proven to be a time consuming and somewhat inefficient task. Thus, it would be desirable to provide an adapter clip which can be quickly and easily attached to an older style cover to provide the necessary abutment surface, allowing the cover to be used with the intermediate plate positioner pins.

SUMMARY OF THE INVENTION

This invention relates to an adapter clip which can be attached to the cover of an older style multiple plate friction clutch to quickly and easily permit the use of intermediate plate positioner pins. The clip includes a central web portion having a circular recessed area formed therein. The web portion is further formed having first and second flange portions which extend in opposite directions from the sides of the web portion. First and second leg portions extend from the opposed ends of the web portion. The first leg portion extends a relatively long distance and terminates in a hooked end portion, while the second leg portion extends a relatively short distance. The adapter clip can be quickly and easily attached in a slot formed in a leg portion of an older style cover to permit the use of intermediate plate positioner pins.

It is an object of this invention to provide an adapter clip which can be quickly and easily attached to an older style clutch cover to allow the cover to be used with intermediate plate positioner pins.

It is another object of this invention to provide such an adapter clip which is simple and inexpensive in construction and installation.

Other objects and advantages of this invention will become apparent to those skilled in the art from the following detailed description of the preferred embodiment, when read in light of the accompanying drawings.

BRIEF DESCRIPTION OF THE DRAWINGS

FIG. 4 is a view similar to FIG. 2 showing the adapter clip of this invention attached to the clutch cover for use with an plate positioning means.

FIG. 5 is an end elevational view of the adapter clip illustrated in FIG. 4.

FIG. 6 is a sectional elevational view of the adapter clip taken line 6—6 of FIG. 5.

FIG. 7 is an end elevational view similar to FIG. 5 of an alternative embodiment of the adapter clip.

DETAILED DESCRIPTION OF THE PREFERRED EMBODIMENT

Figure 1:
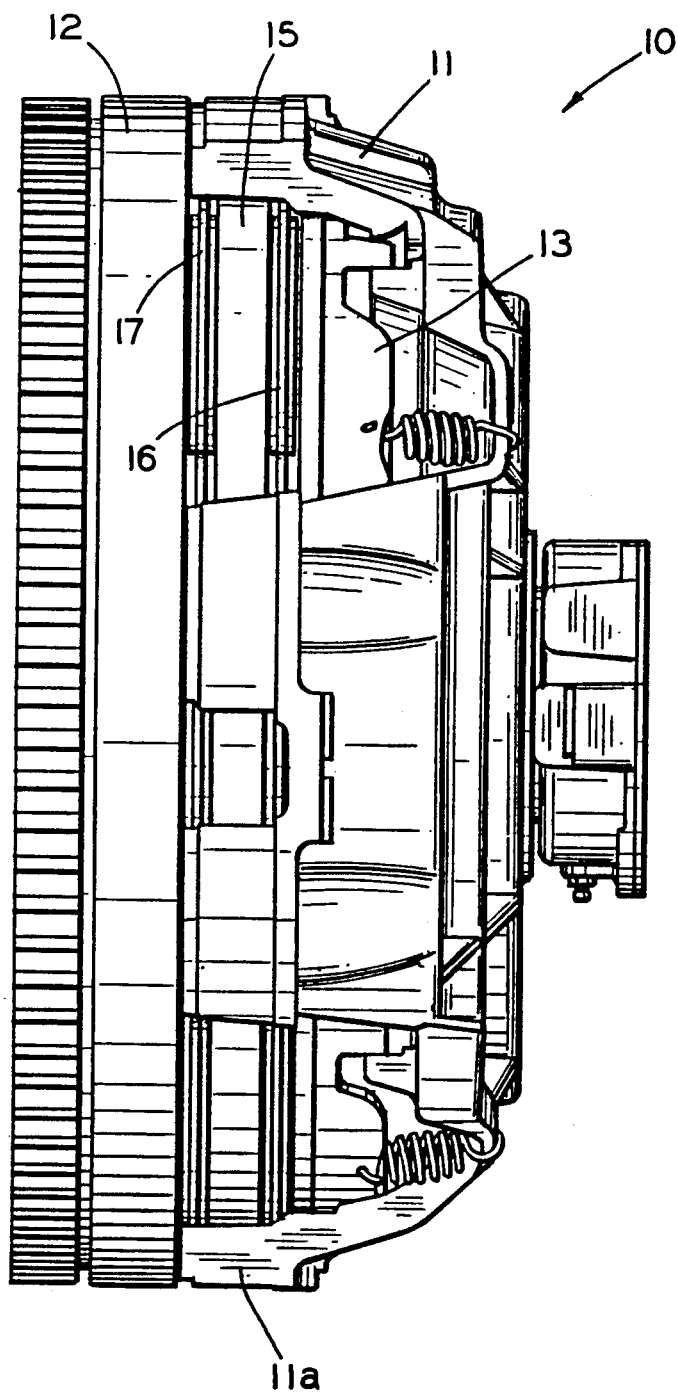
FIG. 1 is a side elevational view of a prior art multiple disc having no intermediate plate positioning means.
Figure 2:
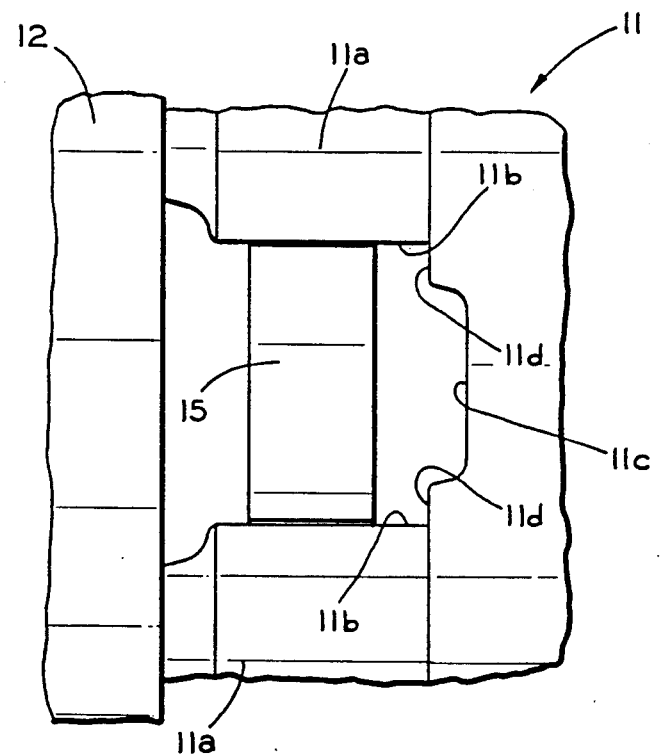
FIG. 2 is an enlarged view of a portion of the clutch illustrated in FIG. 1.

Referring now to the drawings, there is illustrated in FIGS. 1 and 2 a conventional multiple disc clutch, indicated generally at 10. The structure and operation of the clutch 10 are well known in the art, as described in the above-identified patent. The disclosure of that patent is incorporated herein by reference. Only those portions of the clutch 10 which are necessary for a complete understanding of this invention will be described here.

The clutch 10 includes a flywheel ring or cover 11 having a plurality of leg portions 11a. In the illustrated embodiment, four of such leg portions 11a are provided at ninety degree intervals about the circumference of the cover 11. Each of the leg portions 11a extends generally axially and has a slot 11b formed therein. Each slot 11b extends axially from the end of the associated leg portion 11a and terminates in a generally flat axially facing bottom surface 11c. Raised shoulders 11d are formed on the sides of the bottom surface adjacent to the edges of the slot 11b. The shoulders 11d are created when the slot 11b is formed in the leg portion 11a by a conventional metal removing tool, such as a milling cutter.

The leg portions 11a extend axially toward a flywheel 12. The flywheel 12 is connected to a crankshaft (not shown) of a vehicle engine for rotation therewith. The leg portions 11a of the cover 11 are attached to the flywheel 12 by threaded fasteners (not shown) in a known manner. A pressure plate 13 is disposed between the cover 11 and the flywheel 12. Means (not shown) are provided for connecting the pressure plate 13 to the cover 11 for rotation with the cover 11 and the flywheel 12, while permitting the pressure plate 13 to move axially relative thereto. A shift lever assembly (not shown) is provided for selectively moving the pressure plate 13 back and forth in the axial direction.

An intermediate plate 15 is disposed between the flywheel 12 and the pressure plate 13. Means (not shown) are provided for connecting the intermediate plate 15 to the pressure plate 13 for rotation with the cover 11, the flywheel 12, and the pressure plate 13, while permitting the intermediate plate 15 to move axially relative thereto. A first driven disc 16 is disposed between the pressure plate 13 and the intermediate plate 15, while a second driven disc 17 is disposed between the intermediate plate 15 and the flywheel 12. The driven discs 16 and 17 are carried on an output shaft (not shown) of the clutch 10.

When an operator of the vehicle moves the pressure plate 13 toward the flywheel 12 (by means of the shift lever assembly), the driven discs 16 and 17 are frictionally engaged between the pressure plate 13 and the intermediate plate 15 and between the intermediate plate 15 and the flywheel 12, respectively. As a result, the output shaft of the clutch 10 is caused to rotate with the cover 11, the flywheel 12, and the pressure plate 13. When the pressure plate 13 is moved away from the flywheel 12, the driven discs 16 and 17 are released from such frictional engagement so as to disconnect this driving connection. The structure and operation of the clutch 10 thus far described is conventional in the art.

Figure 3:
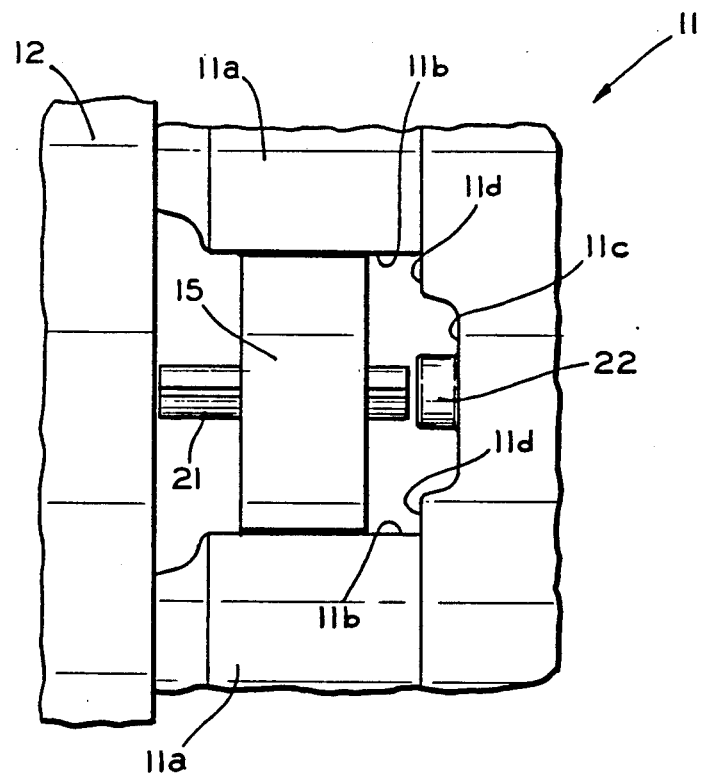
FIG. 3 is a view similar to FIG. 2 showing a prior art clutch intermediate plate positioning means.

The clutch 10 illustrated in FIGS. 1 and 2 is not provided with any means of positioning the intermediate plate 15 between the flywheel 12 and the pressure plate 13 when the clutch 10 is disengaged. FIG. 3 illustrates a known intermediate plate positioning means, indicated generally at 20, for use in the clutch 10. As shown therein, the positioning means 20 includes a plurality of pins 21 (only one is illustrated) which extend through respective apertures (not shown) formed through the intermediate plate 15. The pins 21 are frictionally engaged by the intermediate plate 15 for selective axial movement relative thereto, as described in the above-referenced patent.

Each pin 21 extends within the axial space defined between the flywheel 12 and the bottom surface 11c of the slots 11 formed in the corresponding leg portion 11a. However, as discussed above, the cover 11 illustrated in FIGS. 1 and 2 represents an older style cover which was not designed to provide any convenient abutment surface for pin 21. FIG. 3 shows a prior art boss 22 secured to the bottom surface 11c to form an abutment surface for the end of the pin 21. Such a boss 22 is formed by applying an amount of welding material to the bottom surface 11c, cooling the welding material, and machining the welding material to form the boss 22 having the proper dimensions. As mentioned above, this process was time consuming and cumbersome.

FIG. 4 illustrates an adapter clip, indicated generally at 25, installed on the older style clutch cover 11 to provide a more convenient abutment surface for the pin 21, in lieu of the welded boss 22. FIGS. 5 and 6 illustrate the structure of the clip 25. The clip 25 includes a central web portion 26 having a circular recessed area 26a formed therein. The web portion 26 is further formed having first and second flange portions 27 and 28. The flange portions 27 and 28 extend in opposite directions from the sides of the web portion 26. First and second leg portions 29 and 30 extend from the opposed ends of the web portion 26. The first leg portion 29 extends a relatively long distance and terminates in a hooked end portion 29a, while the second leg portion 30 extends a relatively short distance.

As shown in FIG. 4, the adapter clip 25 is positioned the slot 11b of the leg portion 11a such that the flange portions 27 and 28 rest upon the shoulders 11d. The first leg portion 29 of the clip 25 extends axially over the outer circumferential edge of the cover 11. The hooked end portion 29a of the first leg portion 29 extends over and engages a corner formed on the cover 11 to retain the clip 25 on the cover 11. The second leg portion 30 extends axially over an inner circumferential edge of the cover 11. When installed in this manner, the web portion 26 extends across the gap defined by the slot 11b such that the circular recessed area 26a is axially aligned with the pin 21.

When installed in this manner, the adapter clip 25 provides an abutment surface for the pin 21. Thus, when the clutch 10 is disengaged and the intermediate plate 15 is moved toward the cover 11, the pins 21 will abut the circular recessed area 26a to limit such movement, as described in detail in the above-reference patent. The circular recessed area 26a is provided to properly locate the abutment surface. Thus, the depth of the recessed area 26a may be varied to accommodate differently sized shoulders 11d.

The adapter clip 25 provides a simple and inexpensive alternative to welding the bosses 22 on the cover 11. It will be appreciated that no special tools or experities are required to install the clip 25 on the cover 11. Also, such installation can be accomplished in a very short period of time. Consequently, older style clutches which had no intermediate plate positioning means can be adapted to accommodate such means in a very quick and easy manner.

FIG. 7 illustrates an alternate embodiment of the adapter clip 25'. The adapter clip 25' is identical to the above-described adapter clip 25, except that an aperture 31 is formed through web portion 26. The aperture 31 is preferably offset from the axis defined by the circular recessed area 26a such that at least a portion of the end of the positioner pin 21 passes thereover. The aperture 31 is provided to permit a tool (not shown) to be inserted therethrough into engagement with the exposed end of the pin 21. To accomplish this, a corresponding aperture or notch (not shown) is preferably formed in the cover 11. Thus, when the clutch 11 is installed, the tool may be inserted through the aperture 31 to positively push the pins 21 into their initial starting positions, which is in abutment with the flywheel 12.

In accordance with the provisions of the patent statutes, the principle and mode of operations of this invention have been explained and illustrated in its preferred embodiment. However, it must be understood that this invention may be practiced otherwise than as specifically explained and illustrated without departing from its spirit of scope.

What is claimed is:

1. An adapter clip adapted to be attached to an axial extension of a cover of a multiple plate friction clutch so as to extend over a slot formed in the extension, the adapter clip comprising:
    a central web portion adapted to extend across the slot formed in the extension;
    flange means formed on said web portion for engaging the extension so as to position said web portion relative thereto; and
    leg means formed on said web portion for releasably attaching said adapter clip to the cover.

2. The invention defined in claim 1 wherein said web portion has a recessed area formed therein.

3. The invention defined in claim 2 wherein said recessed area is circular in shape.

4. The invention defined in claim 1 wherein said web portion has an aperture formed therethrough.

5. The invention defined in claim 1 wherein one of said first and second leg portions includes a hooked end portion.

6. A friction clutch for selectively connecting an input shaft to an output shaft for rotation therewith comprising:
    a flywheel adapted to be attached to the input shaft for rotation therewith;
    a cover attached to said flywheel for rotation therewith, said cover including an axial extension engaged with said flywheel, said extension having a slot formed therein defining an axially extending space between said flywheel and said cover;
    a pressure plate disposed between said flywheel and said cover, said pressure plate being connected to said cover for rotation therewith and being axially movable relative thereto between engaged and released positions;
    an intermediate plate disposed between said flywheel and said pressure plate, said intermediate plate including a lug extending into said slot so as connect said intermediate plate to said cover for rotation therewith while permitting axial movement relative thereto;
    first and second axially movable clutch disks adapted to be connected to the output shaft for rotation therewith, said first clutch disk being disposed between said flywheel and said intermediate plate and said second clutch disk being disposed between said intermediate plate and said pressure plate;
    means for selectively exerting a force against said pressure plate to axially move said pressure plate toward said engaged position such that said clutch disks are frictionally engaged between said pressure plate, said intermediate plate, and said flywheel to connect the input shaft to the output shaft for rotation therewith;
    an adapter clip including a web portion and leg means for connecting said web portion to said cover, said web portion extending within said axially extending space; and
    a positioner pin extending through an aperture formed in said intermediate plate lug, said positioner pin having a first end adapted to selectively engage said flywheel and a second end adapted to selectively engage said web portion of said adapter clip.

7. The invention defined in claim 6 wherein said means for connecting includes first and second leg portions formed on the opposite ends of said web portion, said leg portions being engaged with said cover to connect said adapter clip thereto.

8. The invention defined in claim 6 wherein one of said first and second leg portions includes a hooked end portion for releasably connecting said adapter clip to said cover.

9. The invention defined in claim 6 wherein a pair of opposed shoulders are defined in said slot, and wherein said adapter clip further includes first and second flange portions formed on the opposite sides of said web portion, said flange portions engaging said shoulders when said adapter clip is installed on said cover, 10. The invention defined in claim 6 wherein said web portion has a recessed area formed therein.

11. The invention defined in claim 10 wherein said recessed area is circular in shape.

12. The invention defined in claim 6 wherein said web portion has an aperture formed therethrough at least partially aligned with said second end of said positioner pin.

* * * * *